(12) United States Patent
Lo et al.

(10) Patent No.: US 9,129,069 B2
(45) Date of Patent: Sep. 8, 2015

(54) DIGITAL RACK INTERFACE POD SYSTEM AND METHOD

(75) Inventors: Lawrence Lo, Issaquah, WA (US); Karl Mills, Lynnwood, WA (US); Adam W. Lew, Redmond, WA (US); Mehmood Nurmohamed, Bothell, WA (US)

(73) Assignee: AVOCENT HUNTSVILLE CORP., Huntsville, AL (US)

( * ) Notice: Subject to any disclaimer, the term of this patent is extended or adjusted under 35 U.S.C. 154(b) by 196 days.

(21) Appl. No.: 13/877,515

(22) PCT Filed: Sep. 29, 2011

(86) PCT No.: PCT/US2011/054027
§ 371 (c)(1),
(2), (4) Date: May 9, 2013

(87) PCT Pub. No.: WO2012/047717
PCT Pub. Date: Apr. 12, 2012

(65) Prior Publication Data
US 2013/0215884 A1 Aug. 22, 2013

Related U.S. Application Data

(60) Provisional application No. 61/389,616, filed on Oct. 4, 2010, provisional application No. 61/487,590, filed on May 18, 2011.

(51) Int. Cl.
G06F 3/00 (2006.01)
G06F 15/16 (2006.01)
G06F 13/40 (2006.01)
G06F 3/023 (2006.01)

(52) U.S. Cl.
CPC ............ *G06F 13/4068* (2013.01); *G06F 3/023* (2013.01)

(58) Field of Classification Search
None
See application file for complete search history.

(56) References Cited

U.S. PATENT DOCUMENTS 6,105,119 A * 8/2000 Kerr et al. ............... 711/219
6,298,370 B1 * 10/2001 Tang et al. .............. 718/102

(Continued)

FOREIGN PATENT DOCUMENTS

WO WO-2008/021052 A2 2/2008

OTHER PUBLICATIONS

International Search Report and Written Opinion for PCT/US2011/054207, mailed Apr. 5, 2012; ISA/EP.

*Primary Examiner* — Michael Sun
(74) *Attorney, Agent, or Firm* — Harness, Dickey & Pierce, P.L.C.

(57) ABSTRACT

A digital rack interface pod (DRIP) that is able to establish a communications link between a remote access appliance and a server having a USB port and a video port, to facilitate a keyboard/video/mouse (KVM) session between the server and the appliance. The DRIP is also able to establish a communications link between the appliance and an Ethernet port of the server that is associated with a service processor (SP) of the server. In this manner the DRIP is able to route data from the SP of the server to the appliance as well as communications from the appliance to the SP Ethernet port of the server. The DRIP is able to intelligently determine which packets of information received from the appliance are intended for the SP Ethernet port of the server and routes those packets to the SP Ethernet port of the server. The DRIP also automatically monitors and dynamically reassigns its two Ethernet ports as needed so that whichever one of its two Ethernet ports it discovers a connection with the appliance on will be the port that it continues using to communicate with the appliance.

20 Claims, 7 Drawing Sheets

(56) References Cited

U.S. PATENT DOCUMENTS

| | | |
|---|---|---|
| 8,880,582 B2 * | 11/2014 | Zilavy .......................... 709/203 |
| 2003/0110245 A1 * | 6/2003 | Sanders et al. ................ 709/223 |
| 2005/0129035 A1 * | 6/2005 | Saito ............................. 370/401 |
| 2007/0038939 A1 * | 2/2007 | Challen et al. ................ 715/734 |
| 2008/0098411 A1 * | 4/2008 | Dirstine et al. ............... 719/327 |
| 2008/0253085 A1 * | 10/2008 | Soffer .......................... 361/687 |

* cited by examiner

DIGITAL RACK INTERFACE POD SYSTEM AND METHOD

CROSS-REFERENCE TO RELATED APPLICATIONS

This application claims the benefit of U.S. Provisional Application No. 61/389,616 filed on Oct. 4, 2010 and U.S. Provisional Application No. 61/487,590 filed on May 18, 2011. The disclosures of the above applications are incorporated herein by reference.

FIELD

The present disclosure relates to components used to interface a remote access device to server within a data center environment, and more particularly to a digital rack interface pod that enables interfacing a remote access device to an Ethernet port of a server, as well as to serial and video ports of the server.

BACKGROUND

The statements in this section merely provide background information related to the present disclosure and may not constitute prior art.

In a data center environment, often a remote access appliance is used to access and communicate with one or more servers located within the data center environment. In some instances the remote access appliance may form an appliance that allows keyboard and mouse commands from a remote computer to be transmitted to the server, and video signals to be transmitted from the server back to the remotely located computer. Typically a rack interface pod is used to interface the remote access appliance to the server. The rack interface pod is coupled between an Ethernet output of the remote access appliance and the serial and video ports of the server. Typically one rack interface pod is used per server. The rack interface pod operates to digitize analog video signals being output from the video port of the server and to place the digitized video signals into Ethernet protocol format. The digitized signals, in Ethernet protocol format, are then transmitted back to the remote access appliance and then forwarded on to the remote computer that is communicating with the server.

Many present day servers also include an Ethernet port that allows a remote device to access and receive information generated by a service processor within the server. The service processor is a separate processor, typically mounted on a motherboard, that may provide highly useful information concerning a wide variety of performance metrics of the server. Such performance metrics may involve information from various types of sensors built into the server that relate to various parameters such as temperature, cooling fan speeds and power status, as well as other valuable metrics. However, until the present time, interfacing to the Ethernet port associated with the service processor has been accomplished only by the use of a separate cable (often a Cat5 cable), and a separate connection to the remote access appliance. That is, the Ethernet traffic associated with the service processor metrics has not been able to be handled by (i.e., routed through) the rack interface pod. Of course, this necessitates considerable extra cabling and the use of an extra port on the remote access appliance. When one considers that large scale data centers may involve hundreds or even thousands of servers, one can easily gain an appreciation of the significant added expense that the requirement of a separate cable and data port to handle service processor Ethernet traffic can result in. The additional cabling can also contribute to producing a somewhat "cluttered" environment around each of the servers.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
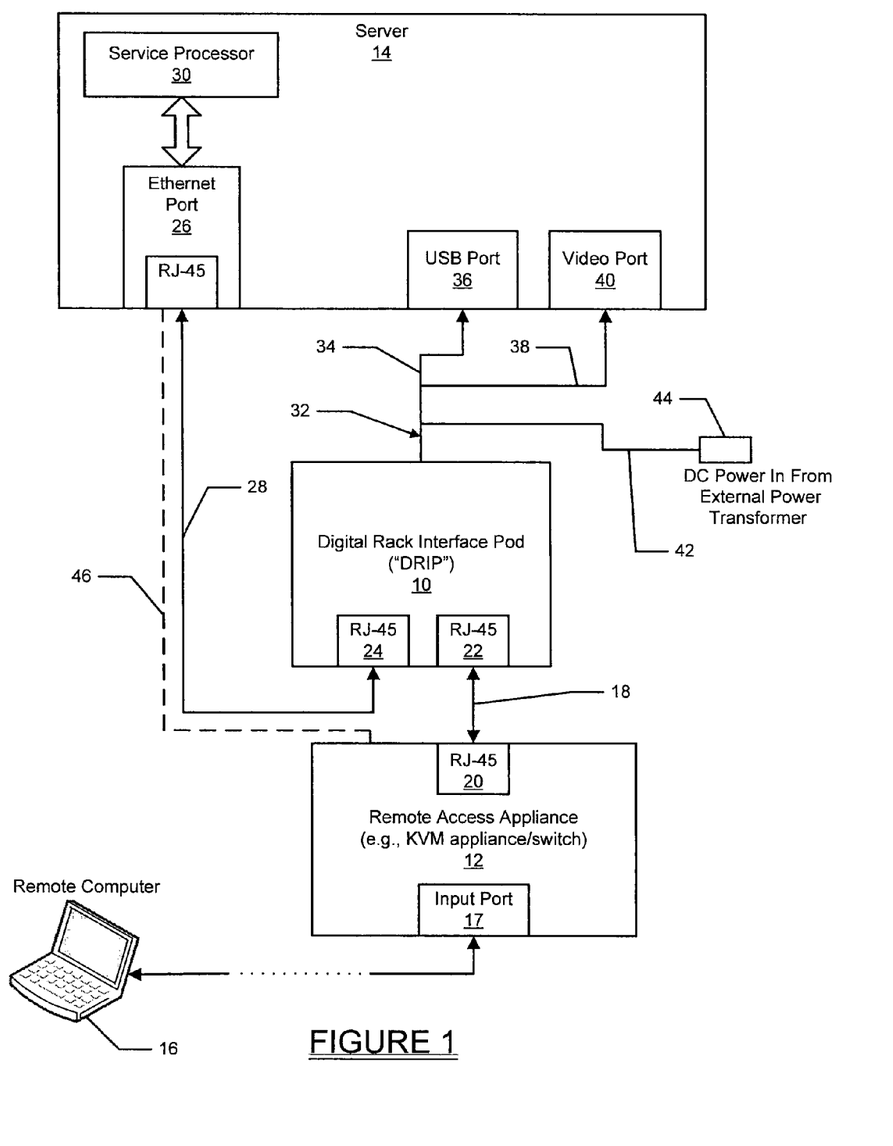
FIG. 1 is a perspective view of a digital rack interface pod ("DRIP") in accordance with one embodiment of the present disclosure.

Referring to FIG. 1 there is shown a digital rack interface pod ("DRIP") 10 in accordance with one embodiment of the present application. For convenience, the digital rack interface pod will be referred to throughout the following discussion as the "DRIP" 10. In this example the DRIP 10 is used to interface a remote access appliance 12 with a server 14. However, it will be appreciated that the DRIP 10 could be potentially be used to interface to any component having a video source and/or USB keyboard/mouse port.

A remote computer 16 or other form of computing device may be in communication with the remote access appliance 12 either via a wide area network, such as the Internet, or via a hard wired connection. The computer 16 may be located remotely from the remote access appliance 12 or may be located in close proximity to the remote access appliance 12. The DRIP 10 may be interfaced to the remote access appliance by a suitable cable 18, such as a Cat5 cable, that connects to an Ethernet port 20 of the remote access appliance 12. The other end of the cable 18 may be coupled to a first port 22 of the DRIP 10. The first port 22 may be formed by any suitable jack, but in one preferred form the first port is formed by an RJ-45 jack.

The DRIP also may include a second port 24, which may also be formed by an RJ-45 jack. In one embodiment the first and second ports 22 and 24 may be formed as a single, custom modular jack. The second port 24 may be interfaced to an Ethernet port 26 of the server 14 by a suitable cable 28. The cable 28 may also be a Cat5 cable. The Ethernet port 26 may also be formed by an RJ-45 jack. The Ethernet port 26 is in communication with a service processor 30 of the server 14. The service processor monitors a plurality of important operating parameters of the server 14 such as temperature, cooling fan speeds, power status, operating system status, just to name a few. The service processor 30 provides information relating to these metrics to the DRIP 30 via signals output from its associated Ethernet port 26.

The DRIP 10 also includes a cable assembly 32 having a portion 34 that interfaces to a serial port, for example a USB port 36, of the server 14, and a portion 38 that interfaces to a video port 40 (typically a VGA port) of the server 14. A major function of the DRIP 10 is to receive keyboard and mouse commands from the computer 16 and to format such commands into serial format, and then to forward them in serial format to the server 14 via cable portion 34. Another major function of the DRIP 10 is to receive analog video signals from the server's video port 40, digitize and format them into Ethernet protocol, and then output the video information in Ethernet format from first port 22 to the remote access appliance 12.

With further reference to FIG. 1, The cable assembly 32 may also include a portion 42 having a suitable plug or jack 44 for receiving DC power from an external DC power transformer. This provides the ability to power the DRIPs 10 internal components via the external DC power transformer. Typically, however, the DRIP 10 will be powered by DC power supplied from the USB port 36 of the server 14.

Figure 2:
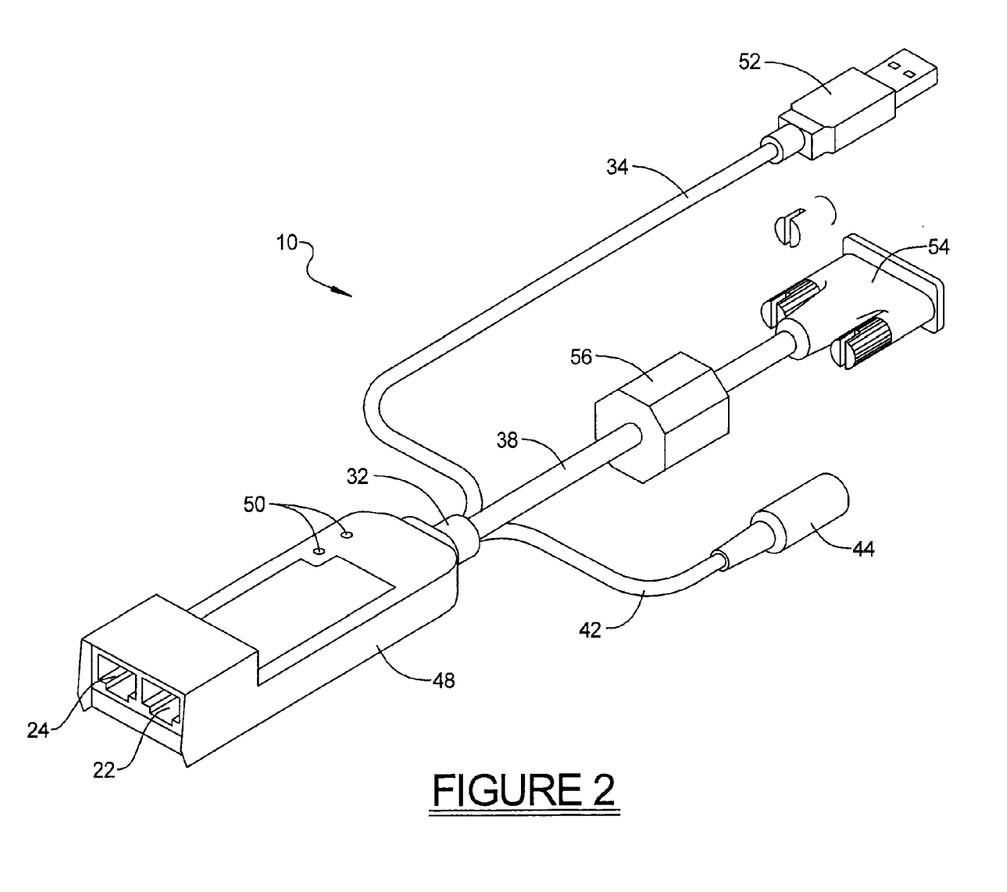
FIG. 2 is a perspective view of one embodiment of the DRIP of FIG. 1.

Referring briefly to FIG. 2, an illustration of one embodiment of the DRIP 10 is shown. The DRIP 10 includes a housing 48 within which the first and second ports 22 and 24, respectively, are housed. The housing 48 may include one or more LEDs 50 for status notification (e.g., flashing during firmware upgrade), or to locate the DRIP 10 by turning on an LED on demand by a user. Cable portion 34 may include a USB connector 52 and cable portion 38 may include a VGA connector 54. Cable portion 42 may include the jack 44, which is shown as a barrel jack in this implementation. A conventional ferrite bead 56 may be included to help reduce RF emissions from the cable 38.

A principal feature of the DRIP 10 is its ability to handle communications between the remote access appliance 12 and the service processor 30 of the server 14. Previously used rack interface pods have required the use of a separate cable, shown by dashed lines 46, that interfaced to a separate port on a remote access appliance. In other words, the communications between the service processor 30 and the remote access appliance 12 did not pass through the DRIP 10. From a practical standpoint, this arrangement can necessitate significant extra cabling (i.e., such as cable 46). This is because the DRIP 10 is typically located in close physical proximity to the server 14, and often within 2-4 feet of the server's USB port 36 and video port 40. So the additional cabling required to interface the DRIP 10 to the Ethernet port 26 is quite minimal (typically less than 6 feet). However, the remote access appliance 12 may be located at some distance, possibly up to 300 feet or more, from the server 14. For example, if the server 14 was located about 250 feet from the remote access appliance 12, then cable 46 shown in FIG. 1 would require a length of at least about 250 feet. Cable 18 shown in FIG. 1 would also typically require a similar length. If the remote access appliance 12 was interfaced to 40 servers, with each server needing to have its Ethernet port interfaced to the remote access appliance 12, then 40 lengths of cabling 46 would be required with each having a length of about 250 feet. In effect, by enabling the DRIP 10 to handle the Ethernet communications between the remote access appliance 12 and the server 14, the amount of cabling required to accomplish this interfacing is dramatically reduced. The degree of reduction may be on the order of about one-half of the cabling that would otherwise be required if the DRIP 10 was not able to handle the Ethernet communications to/from the service processor 30. It will also be appreciated that the dramatic reduction in cabling required when the DRIP 10 is used makes for a significantly less cluttered installation.

Figure 3:
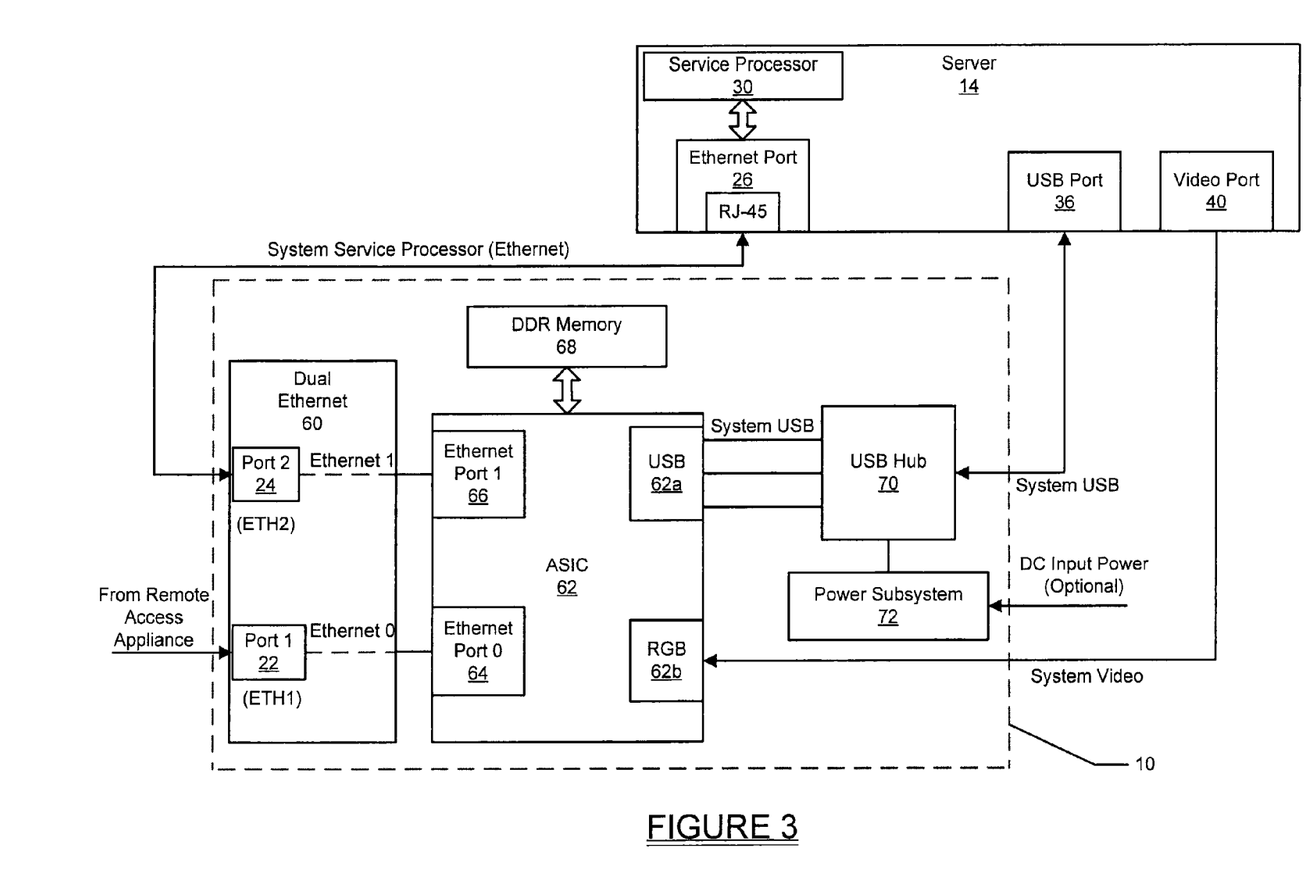
FIG. 3 is a high level block diagram of major subsystems of the DRIP of FIG. 1.

Referring now to FIG. 3, a high level block diagram of the internal components of the DRIP 10 is shown. The DRIP 10 may include a dual Ethernet jack 60 which includes the first and second ports 22 and 24. The dual Ethernet jack 60 communicates with an application specific integrated circuit (hereinafter "ASIC") 62. The ASIC 62 includes ports 64 and 66 for receiving the Ethernet communications present on ports 22 and 24. The ASIC has access to a double data rate (DDR) memory 68 for storing information during processing. A conventional USB hub 70 interfaces the ASIC 62 to the USB cable portion 34 of cable assembly 32. The ASIC 62 is also interfaced to the video cable portion 38 of cable assembly 32. A power subsystem 72 receives DC power from the jack 44 over cable 42 when the jack 44 is coupled to an external DC power transformer, or DC power over cable portion 34 of the cable assembly 32 when the DRIP 10 is being powered in its typical operation state by power from the server's USB port 36.

Figure 3A:
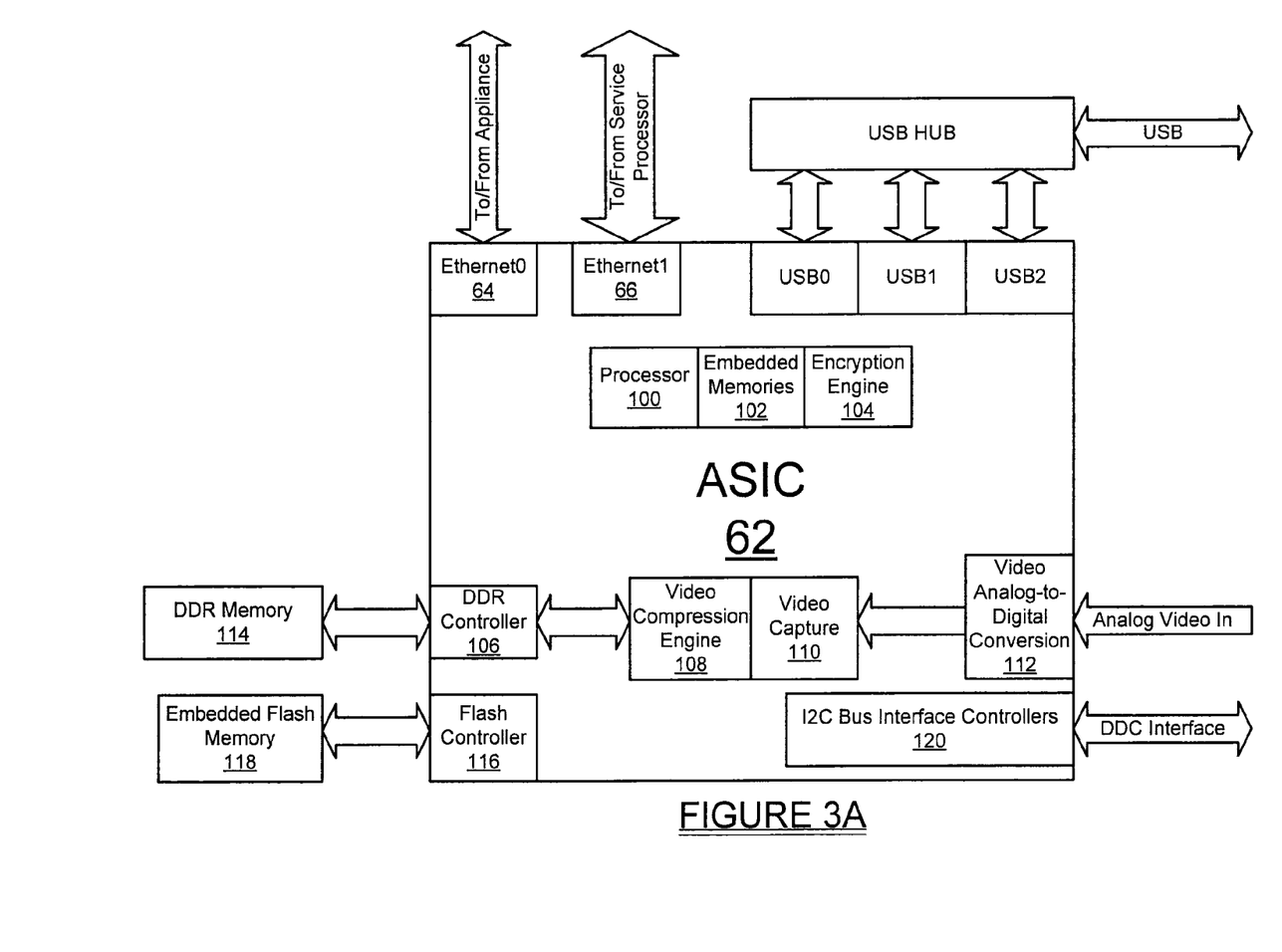
FIG. 3A is a high level block diagram of major components of the ASIC shown in FIG. 3.
Figure 4:
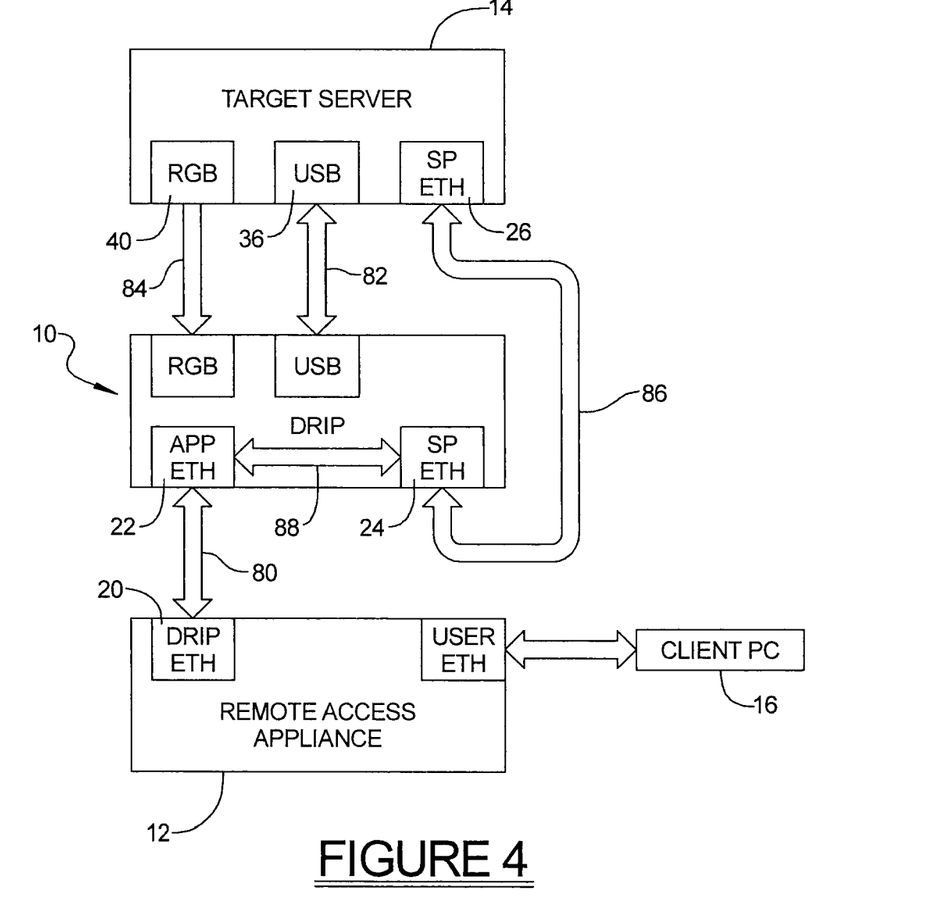
FIG. 4 is a high level block diagram shown a flow of data between the remote access appliance and the server through the DRIP.

FIG. 3A illustrates a high level block diagram of major components of the ASIC 62. The ASIC 62 may include a processor 100, a plurality of embedded memories 102 and an encryption engine 104. The encryption engine 104 is used for hardware encryption of data communicated to the appliance 12. A DDR controller 106 communicates with a DDR memory 114 and with a video compression engine 108. The video compression engine 108 is in communication with a video capture subsystem 110. The video compression engine 108 provides compression of live PC video such that the compressed video data can be stored into memory and transferred across a bus or network using minimal memory and bandwidth. The video capture subsystem 110 performs synchronization, detection and scaling of a video signal received by the ASIC 62. The video capture subsystem 110 receives an output from a video analog-to-digital conversion subsystem 112, which in turn receives an analog video input signal. The video capture 110 subsystem takes analog output from the server 14 and converts it to digital format. A flash controller 116 communicates with an embedded flash memory 118 to handle the execution of application code for boot up of the DRIP 10. An I2C bus interface controller communicates with a DDC interface bus, which informs the server 14 what video capabilities are supported by the DRIP 10 (e.g., screen resolution).

Referring now to FIGS. 4-7, a description of how the DRIP 10 is monitoring for, as well as routing, Ethernet packets received from the appliance 12 will be presented. Initially in FIG. 4 it can be seen that port 22 has been labeled "APP ETH" and port 24 has been labeled "SP ETH". Ethernet packets flow bidirectionally between the appliance 12 and the DRIP 10, as indicated by bidirectional arrow 80. A bidirectional serial communications link exists between the DRIP USB port and the server's 14 USB port, as evidenced by bidirectional arrow 82. Video signals are received from the RGB (i.e., video) port 40 of the server 14, as indicated by arrow 84. Ethernet packets are also transmitted bidirectionally between the server 14 Ethernet port 26 and the SP ETH port 24 of the DRIP 10, as indicated by arrow 86. Arrow 88 indicates that Ethernet packets originating from the server's Ethernet port 26, or being transmitted to the port 26, may be transmitted between the two ports 22 and 24 of the DRIP 10.

Figure 5:
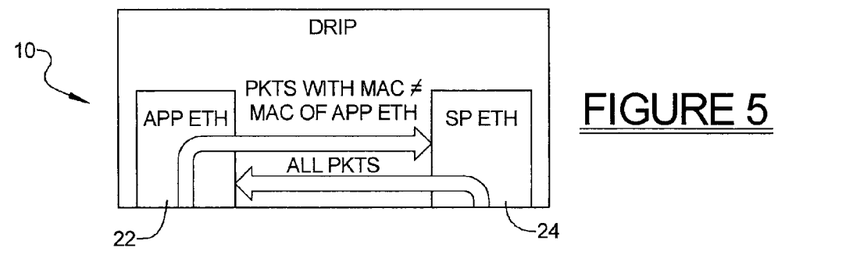
FIG. 5 is a high level block diagram of the DRIP shown how data packets flow between the two Ethernet ports on the DRIP.

In FIG. 5, within the DRIP 10 Ethernet packets are able to flow in both directions between the APP ETH port 22 and the SP ETH port 24. All packets that are received from the server 14 at SP ETH port 24 of the DRIP 10 are routed within the DRIP 10 to its port APP ETH 22. However, for packets received from the appliance 12 at the DRIP's APP ETH port 22, only those packets that have a MAC address that is not equal to the MAC address of the DRIP's APP ETH port 22 will be routed to the SP ETH port 24. Those Ethernet packets that are not routed to the APP ETH port 24 will have the DRIP's 10 MAC address. These packets will be converted to serial protocol signals.

Figure 6A:
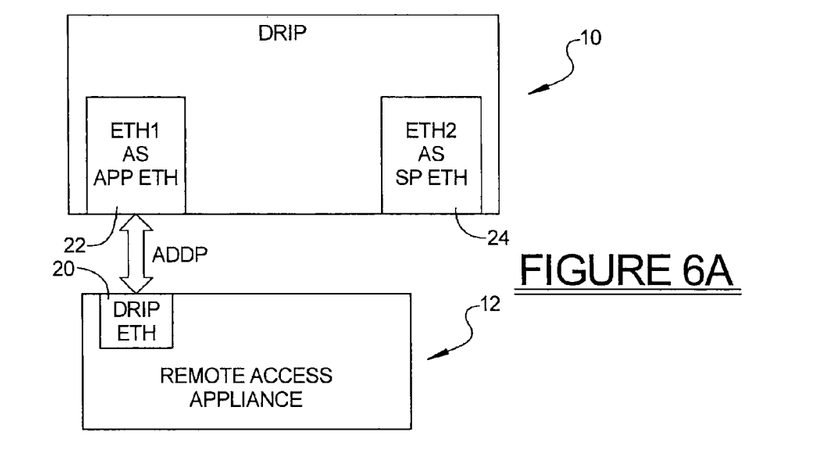
FIGS. 6A and 6B are high level block diagrams showing how the two DRIP Ethernet ports may be configured to act as the port communicating directly with the DRIP.
Figure 6B:
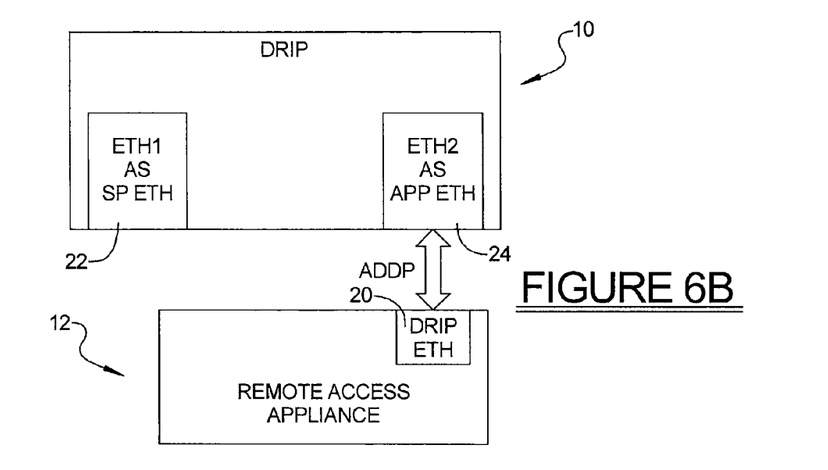

Referring briefly to FIGS. 6A and 6B, it can be seen that the appliance 12 may be coupled to either the Ethernet port 22 or the Ethernet port 24. As will be described in greater detail below, the DRIP 10 is able to dynamically and automatically assign either of the ETH1 port 22 or the ETH2 port 24 as "APP ETH" (i.e., the port that the DRIP 10 recognizes as being directly coupled to the appliance 12.

Figure 7:
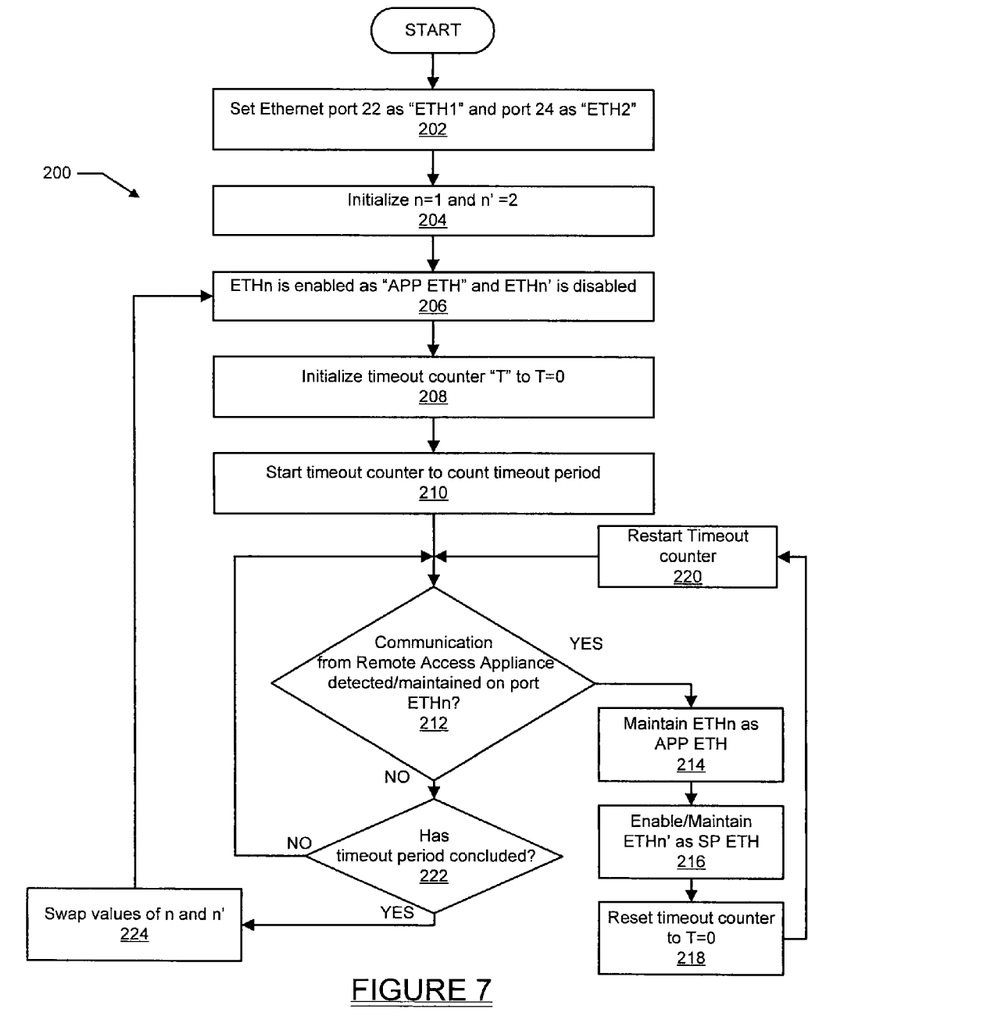
FIG. 7 is a flowchart illustrating one example of a sequence of operations that may be used to detect for communications from the DRIP on either one of the two Ethernet ports of the DRIP.

Referring to FIG. 7 a flowchart 200 is shown illustrating one example of various operations of a discovery and communications protocol referred to as "ADDP" (Avocent DRIP Discovery Protocol) that may be performed by the DRIP 10 in detecting a communication from the appliance 12. This sequence of operations assumes that the DRIP has not yet been coupled via a Cat5 or other suitable cable to the output port 20 of the appliance 12. Initially (as shown in FIG. 6A) at operation 202, Ethernet port 22 is set to "ETH1" and Ethernet port 24 is set to "ETH2". At operation 204 the ASIC 62 sets a variable "n" equal to "1" and a variable "n'" equal to "2". At operation 206 ETHn is then enabled as "APP ETH" on the DRIP 10 and the other Ethernet port on the DRIP is disabled. Thus, in this configuration, as shown in FIG. 6A, port 22 (i.e., ETH1) will be set as the port (i.e., port APP ETH) which the DRIP 10 will initially start monitoring for communications coming from the appliance 12.

At operation 208 a timeout counter is initialized and then the timeout counter is started at operation 210. At operation 212 the ASIC 62 of the DRIP 10 begins monitoring port ETHn of the DRIP 10 (i.e., port ETH1 or port 22, which is now acting as the APP ETH port) for a signal from the DRIP 10. If a communication is received from the appliance 12 at port ETHn, then port ETHn is maintained as the APP ETH port, as indicated at operation 214, and port ETHn' is maintained as port SP ETH port (i.e., assigned to communicate with the Ethernet port 26 of the server 14), as indicated at operation 216. At operation 218 the timeout counter is reset to zero. At operation 220 the ASIC 62 restarts the timeout counter and operation 212 is repeated.

If the check made by the ASIC 62 at operation 212 does not detect a communication with the appliance 12, then a check is made at operation 222 to determine if a predetermined timeout period has been reached by the timeout counter. In practice this timeout period may typically be on the order of 500 ms, although this period could be adjusted if desired. If the check at operation 222 indicates that the timeout counter has not timed out, then operation 212 is repeated. If the check at operation 222 indicates that the timeout timer has timed out, then at operation 224 the ASIC 62 toggles the Ethernet port assignments on the DRIP 10 by swapping the values of n and n' (i.e., n=1 and n=2 to n=2 and n'=1). At operation 206 this has the effect of setting Ethernet port 24 on the DRIP as the APP ETH port and deactivating port 22. The timeout counter is then reset to zero at operation 208, the timeout counter is restarted at operation 210 and operation 212 is repeated by the ASIC 62. However, at this point the ASIC 62 will be checking for communications from the appliance 12 at port 24 (which is now assigned as the APP ETH port). If a communication from the appliance 12 is detected at operation 212 before the timeout counter times out at operation 22, then the DRIP 10 will continue using Ethernet port 24 as the APP ETH port. Thus, from the foregoing description it will be appreciated that the ASIC 62 will toggle the ports 22 and 24 when the timeout counter has timed out. In this manner the ASIC 62 will intermittently be looking at one Ethernet port (22 or 24) on the DRIP 10 and then the other until it detects a communication from the appliance 12.

The ASIC 62 thus provides the advantage that the user is able to hook up the output Ethernet port 20 of the appliance 12 to either of the two Ethernet ports 22 or 24 on the DRIP 10, and the ASIC 62 will still be able detect when it is receiving a communication from the appliance 12. If the user should disconnect the Ethernet output port 20 of the appliance 12 from, for example port 22, and then reconnect it using port 24 of the DRIP 10, the ASIC 62 will be able to detect this change as it periodically toggles the two ports 22 and 24 looking for a communication from the appliance 12. Once it receives a communication from the appliance 12 on one of the Ethernet ports 22 or 24, it dynamically makes the needed adjustment of the port assignments on the DRIP 10 so that that port will thereafter be designed as the APP ETH port on the DRIP 10. Thus, the Ethernet port assignment implemented on the DRIP 10 by the ASIC 62 is not only automatic but it is dynamic as well. If the Ethernet cables are swapped at run-time, the Ethernet port assignments will be swapped by the ASIC 62 without the need for the DRIP 10 or the appliance 12 to be rebooted.

Still further detailed information on the ADDP protocol is presented in "Appendix A" attached hereto. From the Appendix A it will be appreciated that the ADDP not only facilitates the DRIP 10 discovering that it has a connection with the appliance 12, but it also facilitates the appliance discovering that it has a "valid" connection with a DRIP (in this case DRIP 10). Thus, the appliance 12 is assured that it is communicating with the DRIP 10 and not some other Ethernet device. The ADDP also supports authentication, i.e. for the appliance 12 to authenticate a KVM or Virtual media session to the DRIP 10. It may even be used to enable "low-power" mode in the event the DRIP 10 is able to be powered from a backup power source (power provisioned to the DRIP by the Appliance).

What is claimed is:

1. A standalone digital rack interface pod apparatus adapted to facilitate communications between a remote access appliance and a server, where the appliance is disposed remotely from the server and in communication with a user's electronic device, and where the server has a service processor accessible via a service processor port, the apparatus comprising:

a housing having a first bidirectional communications port and a second bidirectional communications port, at least one of the first and second bidirectional communications ports enabling a first communications cable to be coupled thereto to enable a connection to be made to the remote access appliance, and the other one of the bidirectional communications ports enabling a second communications cable to be coupled thereto to enable a connection to be made between the apparatus and the service processor port of the server;

a cable assembly extending from the housing for enabling the apparatus to be coupled to a video port and to a universal serial bus (USB) port of the server;

a circuit disposed in the housing in communication with at least the first and second bidirectional communication ports, the circuit configured to monitor communications from the appliance to the apparatus and to detect the presence of information received by the apparatus, and required to be sent to the service processor of the server, and to route the information identified as needing to be sent from the appliance to the one of the first and second bidirectional communications ports that is coupled to the second communications cable, to thus enable the information to be transmitted to the service processor port of the server, and to route a remaining portion of the information to the USB port via the other one of the first and second bidirectional communications ports.

2. The apparatus of claim 1, wherein the first bidirectional communications port includes an RJ-45 port.

3. The apparatus of claim 1, wherein the second bidirectional communications port includes an RJ-45 port.

4. The apparatus of claim 1, wherein the housing includes:
   a first RJ-45 port that forms a portion of the first bidirectional communications port; and
   a second RJ-45 port that forms a portion of the second bidirectional communications port.

5. The apparatus of claim 1, wherein the circuit comprises an application specific integrated circuit (ASIC).

6. The apparatus of claim 5, wherein the ASIC is configured to alternately scan the first and second bidirectional communication ports to detect when information is initially received from the appliance on one or the other of the first and second communications ports, and to set the one of the first and second communications ports that initially receives a communication from the appliance as the port that is to thereafter communicate with the appliance.

7. The apparatus of claim 5, wherein the first and second bidirectional communication ports each comprise Ethernet ports, and wherein the information communicated between the apparatus and the appliance comprises Ethernet packets.

8. The apparatus of claim 6, wherein the ASIC is configured to detect a MAC address of an Ethernet packet received from the appliance, and if the MAC address of the received Ethernet packet does not match a MAC address assigned to the apparatus, then the apparatus routes the received Ethernet packet to the one of the Ethernet ports that is in communication with the service processor port of the server.

9. The apparatus of claim 7, wherein all of the Ethernet packets received that have a MAC address that matches the MAC address of the apparatus are treated as not being intended to be communicated to the service processor port of the server.

10. The apparatus of claim 1, further comprising a USB hub disposed within the housing and adapted to be coupled via a USB jack to the cable assembly.

11. The apparatus of claim 1, further comprising a double data rate (DDR) memory in communication with the circuit.

12. A standalone digital rack interface pod (DRIP) apparatus adapted to facilitate communications between a remote access appliance and a server having a service processor, the apparatus comprising:
   a housing;
   a first Ethernet port and a second Ethernet port disposed in the housing, the first Ethernet port adapted to enable a first communications cable to be coupled thereto to enable a connection to be made to an appliance, and the second Ethernet port adapted to enable a second communications cable to be coupled thereto to enable a connection to be made with a service processor port of the server;
   a cable assembly extending from the housing for enabling the apparatus to be removably coupled to a video port and to a universal serial bus (USB) port of the server; and
   a circuit disposed in the housing and being in communication with at least the first and second Ethernet ports, and configured to detect the reception of Ethernet packets from the appliance which are directed to either of the first and second Ethernet ports, and to automatically route ones of the detected Ethernet packets needing to be delivered to the service processor of the server to the second one of the Ethernet ports, and to route a remainder of the detected Ethernet packets to the USB port of the cable assembly.

13. The apparatus of claim 12, further comprising a USB hub in communication with the circuit, for interfacing the circuit with the USB port of the server.

14. The apparatus of claim 12, wherein the circuit comprises an application specific integrated circuit (ASIC).

15. The apparatus of claim 14, wherein the ASIC continuously, alternately monitors the first and second Ethernet ports when the apparatus is initially connected to the appliance, and detects which of the first and second Ethernet ports initially receives Ethernet packets having a MAC address that matches a MAC address assigned to the apparatus, and subsequently sets the one of the first and second Ethernet ports that initially receives the Ethernet packets with a MAC address matching the MAC address of the device as the port that is to be treated as the Ethernet port in communication with the appliance.

16. The apparatus of claim 15, wherein the ASIC detects which said ones of the received Ethernet packets have a MAC address that does not match the MAC address assigned to the apparatus, and routes said ones of the Ethernet packets that have a MAC address that does not match the MAC address of the apparatus to the one of the Ethernet ports that is coupled to the second cable, to thus route said ones of the Ethernet packets to the service processor of the server.

17. The apparatus of claim 14, wherein the ASIC continuously, alternately monitors the first and second Ethernet ports each for a predetermined time period.

18. A method for facilitating communications between an appliance and a server, wherein the server includes a service processor accessible via a service processor port, the method comprising:
   providing a standalone apparatus having a circuit housed within a housing of the apparatus, to interface the appliance to the server, the apparatus having a first bidirectional communications port adapted to communicate with the appliance via a first communications cable, and a second bidirectional communications port adapted to communicate with the service processor port via a second communications cable;
   further interfacing the apparatus to a universal serial bus (USB) port of the server and to a video port of the server via a cable assembly extending from the housing;
   using the circuit to monitor for the presence of information received at either of the first and second bidirectional communications ports;
   using the circuit to determine which portions of the information received are intended for the service processor of the server, and
   routing the portions of the information intended for the service processor to the second bidirectional communications port, and routing a remaining portion of the information via the cable assembly to the USB port of the server.

19. The method of claim 18, further comprising alternately monitoring the first and second bidirectional communications ports for predetermined time periods to detect an initial packet of the received information, and assigning the one of the bidirectional communications port that the initial packet of received information is received on as the port that is to receive all further information packets of the received information.

20. The method of claim 18, further comprising need to be directed by the apparatus and monitor a circuit in communication with at least the first and second bidirectional communication ports, the circuit configured to monitor communications from the appliance to the apparatus and to detect the presence of information being sent to the service processor of the server, and to route the information to the one of the first and second bidirectional communications ports that is coupled to the second cable, to thus enable the information to be transmitted to the service processor port of the server.

* * * * *